United States Patent [19]
Hull et al.

[11] Patent Number: 5,956,196
[45] Date of Patent: Sep. 21, 1999

[54] DISK DRIVE EMPLOYING DYNAMICALLY RECONFIGURED READ CHANNEL TO PROCESS A READ SIGNAL AT TWO DIFFERENT FREQUENCIES

[75] Inventors: Richard W. Hull, Laguna Hills; Marc E. Acosta, San Clemente; Carl Bonke, Rancho Santa Margarita; Vafa Rakshani, Laguna Beach, all of Calif.; Ronald E. Wilson, Seyssins, France

[73] Assignee: Western Digital Corporation, Irvine, Calif.

[21] Appl. No.: 08/963,262

[22] Filed: Oct. 28, 1997

Related U.S. Application Data

[63] Continuation of application No. 08/373,794, Jan. 17, 1995, abandoned, which is a continuation of application No. 08/045,580, Apr. 9, 1993, abandoned.

[51] Int. Cl.$^6$ .................................................. G11B 05/35
[52] U.S. Cl. .......................................... 360/65; 360/77.08
[58] Field of Search .................................. 360/77.08, 65, 360/77.02, 77.07, 44, 77.01, 76, 78.04, 46, 48, 51, 77.05; 318/254; 331/2, 1 A; 369/48

[56] References Cited

U.S. PATENT DOCUMENTS

| | | | |
|---|---|---|---|
| 4,172,267 | 10/1979 | Sidman | 360/78.04 |
| 4,535,371 | 8/1985 | Harr et al. | 360/67 |
| 4,914,529 | 4/1990 | Bonke | 360/48 |
| 5,212,601 | 5/1993 | Wilson | 360/44 X |
| 5,223,771 | 6/1993 | Chari | 318/254 |
| 5,278,702 | 1/1994 | Wilson et al. | 360/51 |
| 5,301,072 | 4/1994 | Wilson | 360/77.01 |
| 5,307,217 | 4/1994 | Saliba | 360/76 |
| 5,319,508 | 6/1994 | Tsunoda et al. | 360/77.08 |
| 5,463,603 | 10/1995 | Petersen | 369/48 |

*Primary Examiner*—Aristotelis M. Psitos
*Assistant Examiner*—Patrick Wamsley
*Attorney, Agent, or Firm*—Leo J. Young, Esq.; Milad G. Shara, Esq.

[57] ABSTRACT

A disk drive having an embedded servo disk format preferably having a fixed-number of radial servo sample wedges per track, in which data blocks are located independently of the servo sample wedge locations of any particular track, and can be split around servo sample wedges. Thus, a fraction of a data block, or more than one data block, can be written between consecutive servo sample wedges, beginning almost anywhere in a data wedge. Each data sector has an associated identification (ID) field that includes at least one segment descriptor. Each segment descriptor describes the data segments into which a data block can be split. Provision is made for as many segment descriptors as there can be data segments for a data block. In general, a segment descriptor is a multi-bit digital signal that defines the absolute or relative location of split data segments (or, alternatively, the absolute or relative length of split data segments, from which the location can be determined). A disk system in accordance with the present invention can be independently optimized for flux changes per inch and tracks per inch, and the size of each data sector can be varied. The invention permits "defect swallowing", by allowing a data sector to be split around small defects within a data wedge of a track, and "wedge push down" defect management, in which a data segment can be started at a next servo sample wedge if a large defect occurs in the previous data wedge.

6 Claims, 9 Drawing Sheets

DISK DRIVE EMPLOYING DYNAMICALLY RECONFIGURED READ CHANNEL TO PROCESS A READ SIGNAL AT TWO DIFFERENT FREQUENCIES

This is a continuation of application Ser. No. 08/373,794 now abandoned, filed on Jan. 17, 1998, which is a continuation of application Ser. No. 08/045,580 now abandoned, filed on Apr. 9, 1993.

BACKGROUND OF THE INVENTION

1. Field of the Invention

This invention relates to computer peripheral data storage devices, and in particular to rotating disk data storage units, such as magnetic disk drives, having a novel servo-independent format.

2. Description of Related Art

Rotating disk data storage units ("disk drives") are commonly used to store data in computer systems. Conventionally, each disk drive comprises one or more rotating disks coated with or made from magnetic or optical recording material. Generally, each disk surface is formatted into a plurality of tracks, each track comprising a plurality of physical sectors. Movable read/write transducer heads positioned proximate to each disk surface are used to record the track and sector formats, and to read data from and write data in each physical sector.

Extensive research efforts in the field of magnetic hard disk drives for many years have been directed to developing practical techniques for increasing areal recording density. Improved techniques for increasing areal recording density have been an important enabling factor in the trend in this field toward smaller, yet higher capacity, disk drives.

Areal recording density is generally expressed in terms of bits per square inch (or other unit area). Analytically, areal density is the product of the track density (i.e., the number of concentric tracks per inch, or "TPI") on the surface of a disk, and the bit density (i.e., the number of bits per inch, or "BPI") that can be recorded along a particular track.

Prior art disk drives have included various known methods of increasing disk capacity by increasing areal recording density. One such method entails increasing the bit density; this method includes increasing the data channel rate. Conventional disk drives employ a single data channel rate (such as 15 or 20 MHz) for data transmission from read-write circuitry to an active read-write head and ultimately to the recording media on the surface of a disk. This single data channel rate, or constant recording frequency, has increased over time through use of higher performance read-write circuitry and high resolution read-write heads and recording media.

The heads of a disk drive are generally positioned by means of a closed-loop servo system. In some designs, one side of one disk in a stack of disks is encoded with special servo information as a dedicated servo disk. A ganged set of heads is positioned in response to servo feedback information read by the head corresponding to the dedicated servo disk. However, this type of design is commonly used only when a relatively large number of stacked disks are used, since no data can be stored on the dedicated servo disk surface.

With smaller numbers of stacked disks, a more common design is to write servo information in "servo sample wedges" embedded around the surface of each disk. Such embedded servo designs may have, for example, 17 or more servo sample wedges per disk surface, dividing the tracks on each surface into an equal number of sectors of a circle which may be referred to as "data wedges". FIG. 1 is a top view of a prior art embedded servo disk surface showing eight servo sample wedges 2, eight data wedges 4, an inner track 6, and an outer track 8. However, in modern embedded servo disk drives, the number of data wedges on a track may be as high 56 or more.

In conventional disk drives, the disks are rotated at a constant angular velocity. As an active read-write head is displaced radially outward from the innermost track, successive circumferential tracks pass beneath the head at an increasing linear velocity. In constant frequency recording, linear bit density along a track is determined by the maximum number of flux changes per inch ("FCI") that may be recorded on the innermost data track of a disk drive. This number is largely determined by the quality of the read-write electronics and the read-write head/recording media combination, and varies from design to design. However, for a particular design, recorded flux transitions become farther and farther apart as radial displacement increases since the circumferential length of a data track is proportional to the track radius. Accordingly, linear bit density on the outermost tracks is substantially less than on the innermost tracks.

This is shown in a stylized manner in FIG. 2 for an embedded servo disk drive. FIG. 2 is a graphical diagram of an enlarged top view of a prior art embedded servo disk surface showing a data wedge 4 recorded using a constant frequency recording format. A constant frequency signal is recorded in a physical sector 6a of an inner track 6 and in an outer physical sector 8a of an outer track 8 between two servo sample wedges 2. Once servo positioning requirements of a system and the maximum number of flux transitions that may be recorded on the innermost data track of a disk drive are determined, the maximum linear bit density defines the number of data wedges 4 and of servo sample wedges 2 per track.

In a number of embedded servo disk drives known in the art, each data wedge has been used to store only a single sector of data. That is, the fields comprising a sector of data must fit between consecutive servo sample wedges (i.e., the concepts of a "data wedge" and "sector" essentially have been synonymous). In common disk drive types, a data sector typically comprises 512 or 1024 bytes of data, plus header and trailer sections that contain sector synchronization, identification, error correction, and other fields. Accordingly, referring to FIG. 2, even though the outer tracks 8 are longer than the inner tracks 6, and hence are capable of storing more total flux changes at the same FCI rate as the innermost track, such capacity is wasted because the maximum FCI on the innermost track sets a limit on the linear bit density for all outer tracks 8. Thus, constant frequency recording suffers from having a radially decreasing bit density, thereby severely under-utilizing a large portion of the disk surface.

In another prior art drive, data sectors have been split in a fixed and repetitive ratio between adjacent data wedges. However, no known prior art drive has been capable of accommodating a variable or non-integer number of data sectors per data wedge, or arbitrarily splitting data sectors between data wedges.

Another pertinent prior art method is directed to a goal of increasing areal recording density by attempting to achieve what is conventionally termed constant density recording. Ideally, constant density recording would involve the linear bit density of flux changes per unit length remaining constant. Accordingly, the circumferential length of a data sector would remain constant and no longer increase in length with radial displacement outward. In order to accomplish constant linear bit density recording, the recording frequency must increase in proportion to track circumference.

One attempt in the prior art to achieve constant density recording is commonly known as zone bit recording ("ZBR"). In an example of ZBR with embedded servo sectors ("embedded ZBR"), an attempt was made to maximize areal recording density by increasing the number of servo sample wedges 2 from zone to zone. FIG. 3 is a simplified graphical diagram of a top view of a prior art embedded servo disk surface recorded using a zone bit recording format. Concentric zones 10a, 10b, 10c are defined as shown. Zone boundaries 20 may be arbitrarily placed to increase the number of physical sectors per zone 10.

Although embedded ZBR increases the total data storage capacity of the disk surface by maximizing the use of recording area in each zone 10, the servo sample wedges 2 are no longer radially constant for all tracks. This results in a number of disadvantages. Data storage space is lost between zones, because an inter-zone "guard band" (typically two tracks in width) is required at each zone boundary 20 to prevent errors in synchronizing to servo signals on the inner/outer servo sample wedges 2. Because the number of servo sample wedges 2 in outer zones is greater than the number in inner zones, optimization of servo channel rate for servo control efficiency is no longer possible. The servo loop dynamics of the system (the transfer response curve) changes from zone to zone, increasing the complexity of the system. A faster and more expensive processor is required to handle the increased servo channel rate in outer zones. Further, any increase of servo sample wedges 2 above the optimum required for servo control takes away from track space which could be used to increase areal data recording density.

Accordingly, it is desirable to provide a disk formatting technique that provides better storage capacity utilization than present embedded servo disk formats, including embedded ZBR formats, without the complexity of present systems. The present invention provides such a format and technique.

SUMMARY OF THE INVENTION

The invention comprises a disk drive having, an embedded servo disk format preferably having a fixed-number of radial servo sample wedges per track, in which data blocks are located independently of the servo sample wedge locations of any particular track, and can be split around servo sample wedges. Thus, a fraction of a data block, or more than one data block, can be written between consecutive servo sample wedges, beginning almost anywhere in a data wedge.

In the preferred embodiment, data blocks are part of data sectors, and such data sectors further include a header. In the preferred embodiment, the header for each data sector contains an identification (ID) field that includes at least one segment descriptor. Each segment descriptor describes the data segments into which a data block can be split. Provision is made for as many segment descriptors in an ID field as there can be data segments for a data block.

In general, a segment descriptor is a multi-bit digital signal that defines the absolute or relative location of split data segments (or, alternatively, the absolute or relative length of split data segments, from which the location can be determined). In alternative embodiments, the segment descriptors may be stored independently of a header, such as in a servo sample wedge or look-up table stored on the disk media or in an electronic storage device (such as a ROM). In another embodiment, segment descriptors may be computed algorithmically for each track. In yet another embodiment, tracks may be grouped into a plurality of zones, and a set of segment descriptors, stored or generated as described above, used for all of the tracks in a particular zone. In still another embodiment, data sectors do not include headers.

The present invention provides an improvement in storage capacity over prior art embedded servo disk formats, including embedded ZBR formats In particular, the invention has the following advantages:

No space-wasting inter-zone guard bands are required, as in embedded ZBR, since a fixed number of servo sample wedges are preferably used for the entire disk surface.

No surplus servo sample wedges.

Because the data channel rate and servo channel rate are completely independent, the system can be independently optimized for flux changes per inch and tracks per inch.

Servo sample wedges can be phase coherent, thereby minimizing servo system complexity.

The bandwidth of the system microprocessor can be optimized to match the servo feedback loop requirements.

The size of each data block can be varied between tracks.

The size of each data segment can vary between data wedges and tracks.

The invention permits "defect swallowing", by allowing a data block to be split around small defects within a data wedge of a track.

The invention provides for "wedge push down" defect management, in which a data segment can be started at a next servo sample wedge of a track if a large defect occurs in the previous data wedge of the track.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Overview

Figure 1:
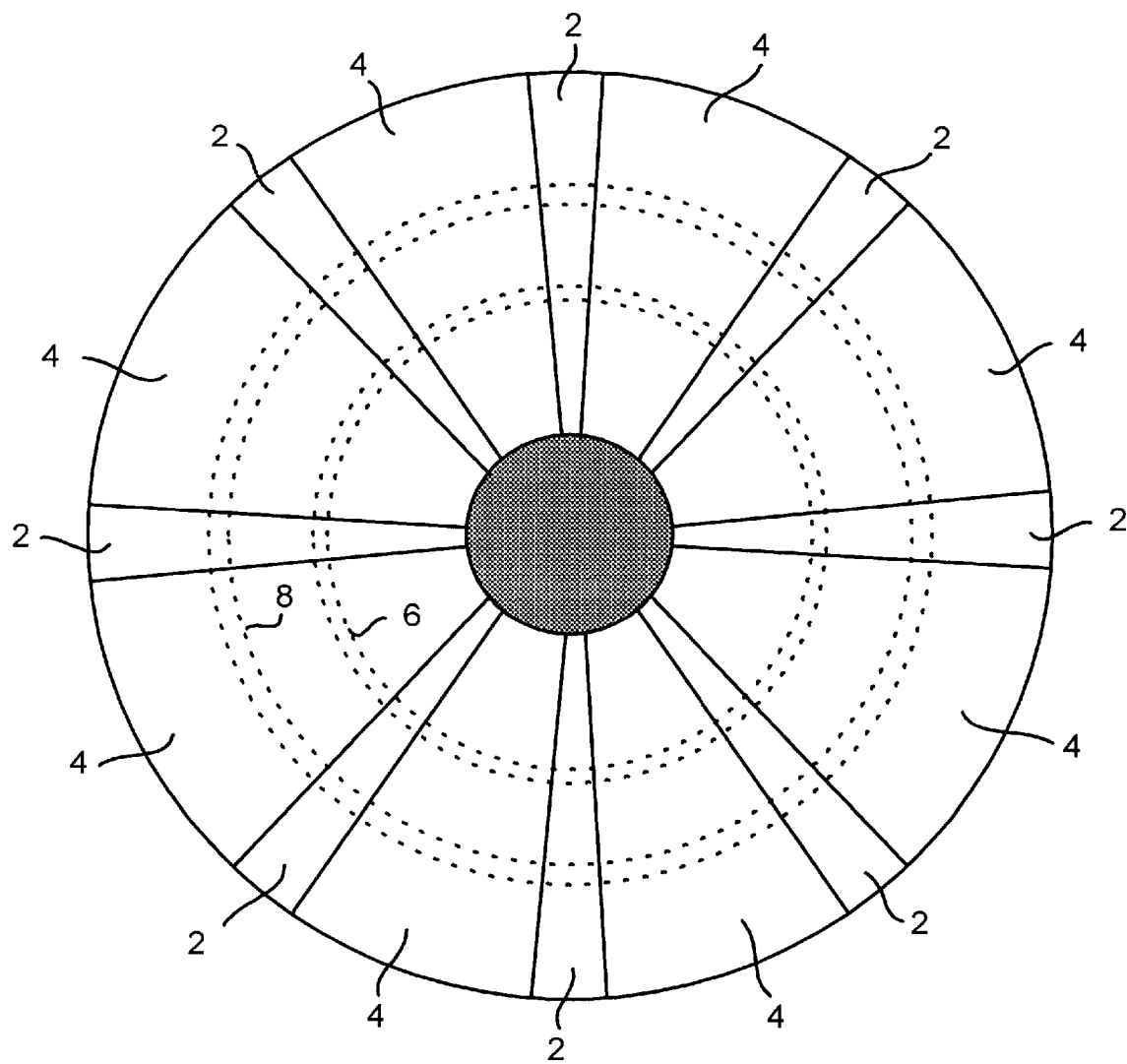
FIG. 1 is a graphical diagram of a top view of a prior art embedded servo disk surface showing servo sample wedges and data wedges.
Figure 2:
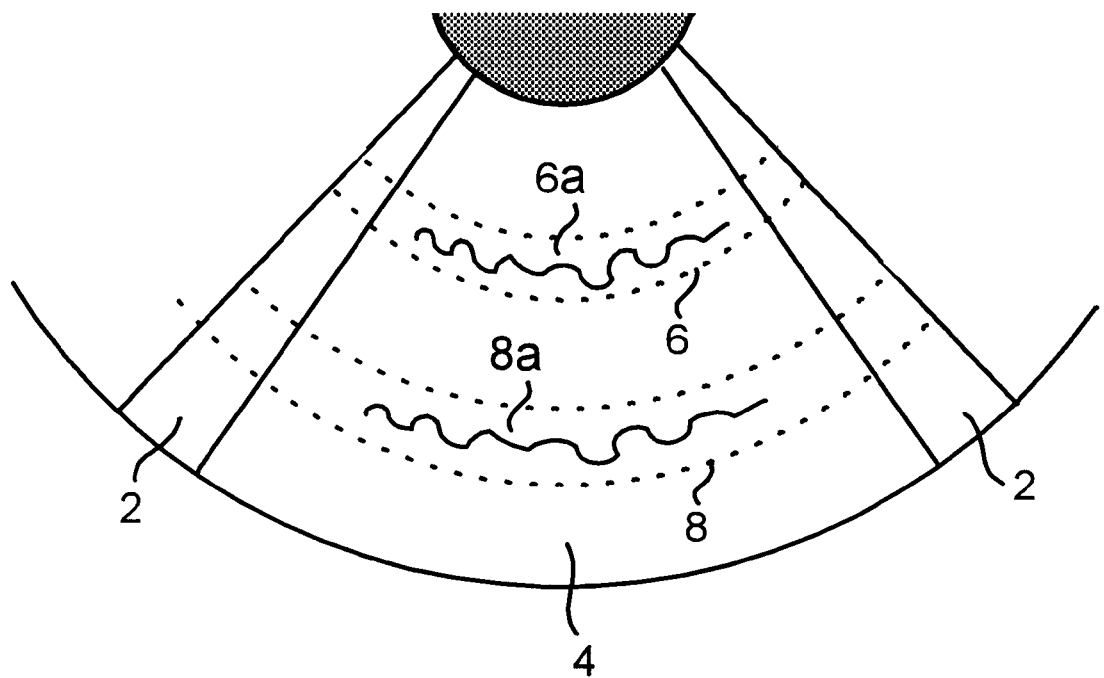
FIG. 2 is a graphical diagram of an enlarged top view of a prior art embedded servo disk surface showing a data wedge recorded using a constant frequency recording format.
Figure 3:
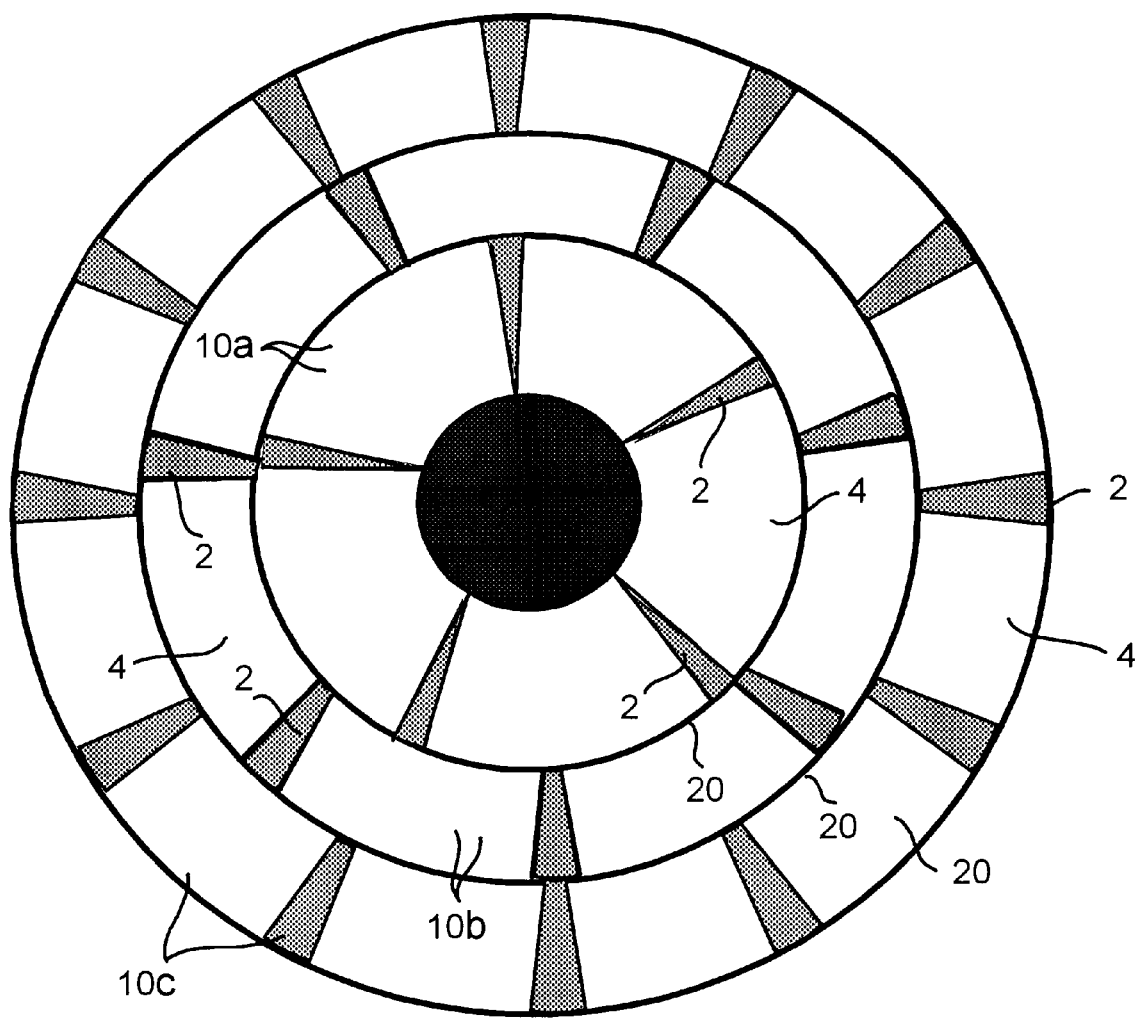
FIG. 3 is a graphical diagram of a top view of a prior art embedded servo disk surface recorded using a zone bit recording format.
Figure 4:
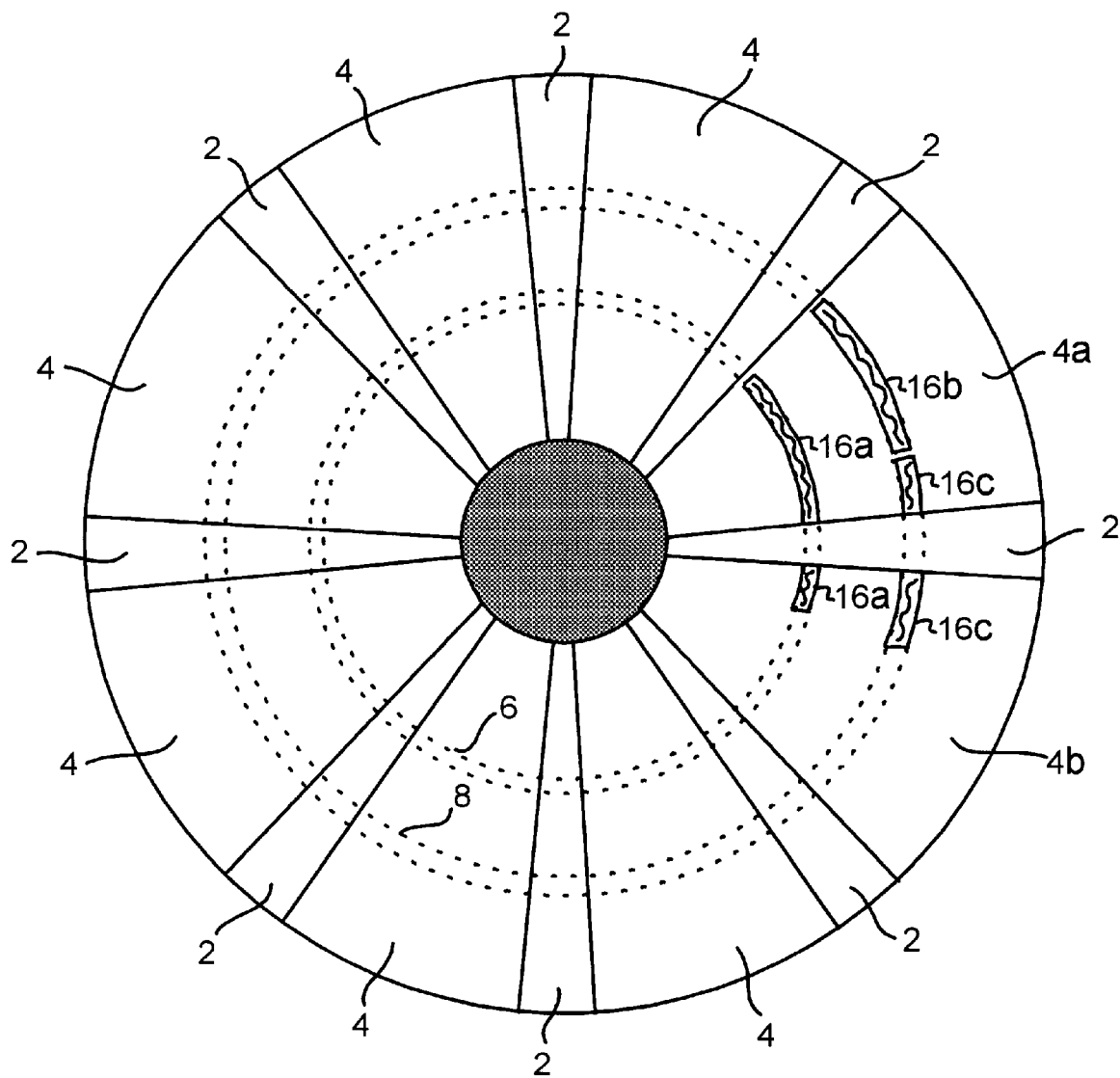
FIG. 4 is a graphical diagram of a top view of an embedded servo disk surface in accordance with the preferred embodiment of the present invention, showing servo sample wedges and data sectors.

FIG. 4 is a graphical diagram of a top view of an embedded servo disk surface in accordance with the preferred embodiment of the present invention, showing a radially constant number of servo sample wedges 2, a radially constant number of data wedges 4, and a number of example constant frequency recorded data sectors 16. As can be seen, the present invention does not require that each data sector 16 correspond exactly to a data wedge 2. Thus, on an inner track 6, one data sector 16a is split between two data wedges 4a, 4b. In an outer track 8, one data sector 16b and part of another data sector 16c are within a data wedge 4a. By not constraining data wedges 2 to hold an integer number of data sectors 16, and by allowing a data sector 16 to begin essentially anywhere with respect to servo sample wedges 2, the storage capacity of the present invention is substantially increased in comparison to the prior art.

Servo-Independent Disk Drive Format

Figure 5:
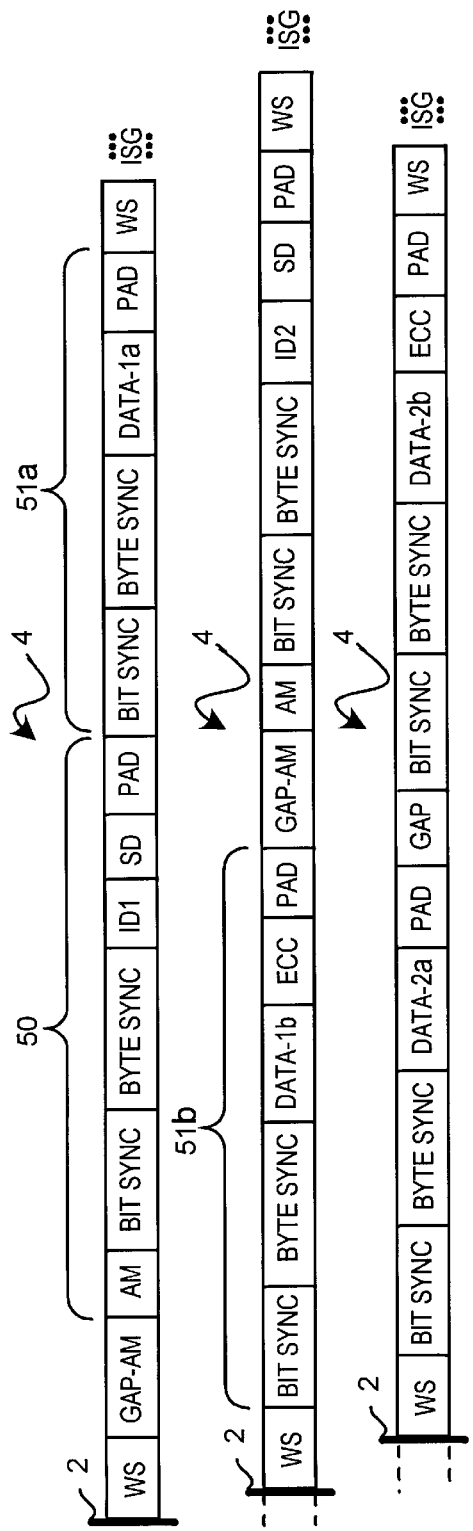
FIG. 5 is diagram of a partial disk track formatted in accordance with the preferred embodiment of the present invention, before a Write operation.

FIG. 5 is a diagram of a partial disk track formatted in accordance with the preferred embodiment of the present invention, before a Write operation (note that the field sizes are not to scale). Each servo sample wedge 2 defines a boundary between two data wedges 4. Hence, within a track, the servo sample wedges 2 define a plurality of data wedges 4. Within each data wedge 4 are whole or partial data sectors 16, each comprising a number of fields. A data sector 16 can begin almost anywhere with respect to a preceding servo sample wedge 2.

As shown in FIG. 5, a data sector 16 in the preferred embodiment comprises a sector header 50 and a data block 51 comprising one or more data segments 51a, 51b. The sector header 50 comprises an AM field, a BIT SYNC field, a BYTE SYNC field, an ID field, a novel SD field, and a PAD field, preferably recorded in the order shown. Each data segment 51a, 51b of a data block 51 comprises a BIT SYNC field, a BYTE SYNC field, a DATA field, and a PAD field, preferably recorded in the order shown. The last data segment for a data sector 16 also has an ECC field before the PAD field. Note that the present invention permits a data block 51 to be split from its associated header 50 across a servo sample wedge 2.

The various field types, most of which are standard in the art, are:

WS—Write Splice; a space for permitting a read/write transducer head to be energized for writing without changing bits in other fields unintentionally.

GAP-AM—A bit pattern that prevents or minimizes a WS field from being interpreted as an Address Mark.

AM—Address Mark; a unique pattern used to delineate the beginning of a sector header.

BITSYNC—A specific RLL code used to ensure that a phase-lock oscillator is synchronized, thereby enabling a determination of the locations of the boundaries between adjacent bits of subsequent fields. Also known as a PLO-Lock field.

BYTESYNC—A particular bit pattern that ensures byte synchronization so as to enable a determination of the locations of the boundaries between adjacent bytes of subsequent fields.

ID—A sector identification field that includes a flag subfield (used for indicating, for example, whether the sector is defective), and a Logical Block Address ("LBA") for the associated data sector.

Figure 6:
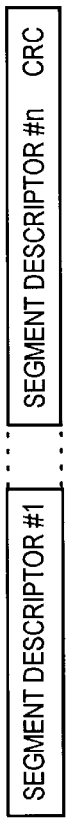
FIG. 6 is a diagram of the data fields of a data wedge identification field in accordance with the preferred embodiment of the present invention.

SD—A Segment Descriptor field that contains one or more segment descriptor subfields and a flag subfield in accordance with the present invention, as described below in conjunction with FIG. 6.

PAD—A variable length field used to pad the length of a sector header or a data segment to a desired fixed length.

DATA—A variable length field for storing data in a data segment.

ECC—A fixed length field for storing the error correction code associated with the data for the entire data sector.

GAP—Variable length areas used to skip defects between data segments, or to separate a sector header 50 from a data block 51.

ISG—An Intersector Gap comprising an unformatted region of a track for tolerance of various factors, such as variations in spindle motor speed.

The generation, format, and recording of the fields described above (other than the format of the SD field) are in accordance with known prior art techniques.

In addition to the general field order for the sector header 50 and data block 51 as set forth above, the following rules apply to recording a storage unit track in accordance with the present invention:

1. A WS field occurs before and after each servo sample wedge 2.

2. During formatting, a GAP-AM field is written before each address mark AM.

3. A GAP field is used to skip all defects when "defect swallowing", as described below.

Segment Descriptors

As noted above, each data sector 16 contains an associated Segment Descriptor ("SD") field. FIG. 6 is a diagram of the subfields of an SD field in accordance with the preferred embodiment of the present invention. The SD field includes at least one Segment Descriptor subfield, and may include a cyclic redundancy check (CRC) subfield computed on the entire SD field. Each Segment Descriptor subfield is essentially a map describing the data segments into which a data block 51 can be split In the preferred embodiment of the invention, a Segment Descriptor subfield comprises 2 bytes (16 bits) per data segment. Provision is made for as many Segment Descriptor subfields in an SD field as there can be data segments for a data sector 16. Thus, for example, if the data sectors 16 of a track can be split between up to three data segments, then each SD field for the data sectors 16 of that track would have three Segment Descriptor subfields.

In the preferred embodiment, 12 of the 16 Segment Descriptor bits are used to indicate the number of bytes of data in the corresponding segment. Accordingly, the preferred embodiment of the invention allows each data segment to hold up to 4,096 bytes ($2^{12}$). The remaining 4 bits are used for flag information. For example, referring to FIG. 5, the SD field in the sector header 50 may have two Segment Descriptors, indicating that the data for the corresponding data block 51 can be split between two data segments 51a, 51b. If the data sector 16 as a whole contains 512 bytes of data, and the DATA-1a field of the first data segment 51a contains 312 bytes, the Segment Descriptor for the first data segment DATA-1a would have a binary value equal to 312 (decimal), while the Segment Descriptor for the DATA-1b field of the second data segment 51b would have a binary value equal to 200 (decimal).

By allotting 12 bits to indicate the number of bytes of data in a corresponding segment, the size of allowed data blocks 51 can be varied. Thus, a first group of tracks can be formatted to accommodate 512 byte data blocks, a second group of tracks can be formatted to accommodate 1024 byte data blocks, and a third group of tracks can be formatted to accommodate 4096 byte data blocks.

As few as 9 bits could be used in a Segment Descriptor to indicate the number of bytes in a "standard" 512-byte data block, thus decreasing the size of the Segment Descriptor by 19%. Even fewer bits could be used by requiring Segment Descriptors to refer to a multi-byte group or word count rather than to a byte count. For example, 8 bits could be used with 512 byte data blocks if an even number of bytes is required to be stored in each data segment.

Further, the last Segment Descriptor in a set could be omitted if the data block 51 size is kept constant, since the number of bytes stored in the last data segment can be computed by subtracting the total number of bytes indicated as stored in prior data segments from the constant data block size. Thus, if a data block 51 can be split into no more than three data segments, and the data block has a constant size of 512 bytes, then only two Segment Descriptors are required to describe all three data segments, thereby saving 33% of the Segment Descriptor overhead However, an advantage of dedicating a Segment Descriptor for each possible data segment is that variable size data blocks can be accommodated. That is, since a count is kept within the Segment Descriptors of the bytes within each data segment of a data block 51, the size of the data block 51 need not be known beforehand.

In the preferred embodiment of the invention, the four flag bits of each Segment Descriptor are used to indicate the following:

LAST DATA SEGMENT. This flag is set if the corresponding data segment is the last data-containing data segment of a set (alternatively, this flag could be omitted by assuming that a byte count of zero indicates the last data segment).

APPENDED ECC. This flag is set if the corresponding data segment has an appended ECC field (alternatively, this flag could be omitted simply by keeping track of which data segment is the last containing data, and assuming that the ECC field follows that data segment).

WAIT/NOT WAIT. This flag is set to indicate to wait for the next servo sample wedge 2 after reading/writing the current data segment. This feature of the invention permits "defect swallowing", by allowing a data sector to be split around small defects within a data wedge 4 of a track. In the preferred embodiment, a flag value of "0" indicates that the corresponding data segment does not fill the current data wedge 4, and that a fixed-length space is to be disregarded, or "skipped", so that a next data segment 4 or a next data sector 16 within the same data wedge 4 can be written or read. (In the example shown in FIG. 6, the DATA-2a and DATA-2b fields are split around a defect using this feature). A flag value of "1" indicates that the corresponding data segment extends to about the end of the current data wedge 4, and that the next data sector 16 or next data segment starts after the next servo sample wedge 2.

SKIP NEXT DATA WEDGE. This flag is set in order to disregard, or "skip over", the next servo sample wedge 2 and data wedge 4 if a defect exists therein. This feature of the invention provides for "wedge push down" defect management, in which a data segment can be started at a next servo sample wedge 2 of a track if a large defect occurs in the previous data wedge 4 of a track.

The process for determining the values for each Segment Descriptor can be done manually or by computer program. Essentially, starting with the maximum FCI rate for the innermost track of a disk, the number of bits between servo sample wedges 2 can be determined for the innermost track. With that information, data sectors 16 of pre-set length can be "mapped" onto the data wedges 4 for the innermost track starting from an arbitrary radial index mark on the disk. The following general rules apply:

1. If a data sector 16 would fit within a data wedge 4, then only one data segment is required to accommodate the entire data block. Therefore, the full length of the data block (e.g., 512 bytes) is recorded in the corresponding Segment Descriptor subfield of an "empty" data sector 16.

2. If a data sector 16 would be too long to fit within the remaining space of a data wedge 4, its data block structure is split between one or more data segments, and the length of each data segment (e.g., 312 bytes and 200 bytes) is recorded in the corresponding Segment Descriptor subfield.

3. If a data segment would be the last data-containing data segment of a set, then the LAST DATA SEGMENT flag is set in the corresponding Segment Descriptor subfield.

4. If a data segment would have an appended ECC field, then the APPENDED ECC flag is set in the corresponding Segment Descriptor subfield.

The above procedure is repeated until the entire track has been mapped onto data sectors 16 having a data block 51 of a selected size. The procedure is then repeated for the next radially outward track until the entire available disk surface has been mapped.

The concentric tracks may be grouped into zones, with all tracks within a zone having the same mapping of data sectors 16. A next outer zone may be started with a new mapping whenever the circumferential length of the innermost track for that zone is at least one (or some other number) data sector length greater than the innermost track of the next inner zone. However, guard bands are not necessary between zones because the servo sample wedges 2 on the disk surface are the same from zone to zone. If zones are used (for example, 10 per disk surface), the Segment Descriptors for each track of a zone are the same, thus reducing the number of Segment Descriptor fields that need to be generated or stored to map the data segments of the zone. Accordingly, one of the alternative means described below for generating or storing Segment Descriptors may be preferred to storing Segment Descriptor fields with each data sector 16 in a zone.

Defect Handling

Once the surface of a particular disk type is mapped in this manner, that mapping can be applied to all disks of that type. However, when a particular disk is low-level formatted to actually write the mapped fields of sector headers 50 and "empty" data block 51, the defects on that disk must be accommodated. Accordingly, each such disk may be formatted by writing sector headers 50 and "empty" data blocks 51, as described above, with the following additional rules being applied:

1. If a defect exists (e.g., a region of a track on which data cannot be reliably written and read back), a decision is made as to whether the defect is small enough to be "swallowed" (i.e., whether sufficient recordable space exists in a track of a particular data wedge 4 to make using it worthwhile). A defect is "swallowed" by splitting data across data segments that bracket the defective region. The WAIT/NOT WAIT flag in the corresponding Segment Descriptor subfield is set to indicate that a fixed number of bits spanning the defect (or the corresponding number of bit cell times) should be skipped between the two data segments.

2. If a defect is too large to "swallow", the SKIP NEXT DATA WEDGE in the corresponding Segment Descriptor subfield is set in order to indicate that the next servo sample wedge 2 and data wedge 4 should be skipped over. As noted above, this feature of the invention provides for "wedge push down" defect management, in which a data segment can be started at a next servo sample wedge 2 if a large defect occurs in the previous data wedge 4.

Alternatively, a separate defect table may be maintained for each particular disk, and a "standard" data segment mapping used for all disks of that type. The individualized defect table may be used to "override" the "standard" mapping for a particular track of a disk, typically by indicating that a defective data wedge 4 on a track is to be skipped. Such a defect table may be stored for each disk on the disk media or in an electronic device such as a PROM or flash memory device or similar device.

Write Processing

Figure 7:
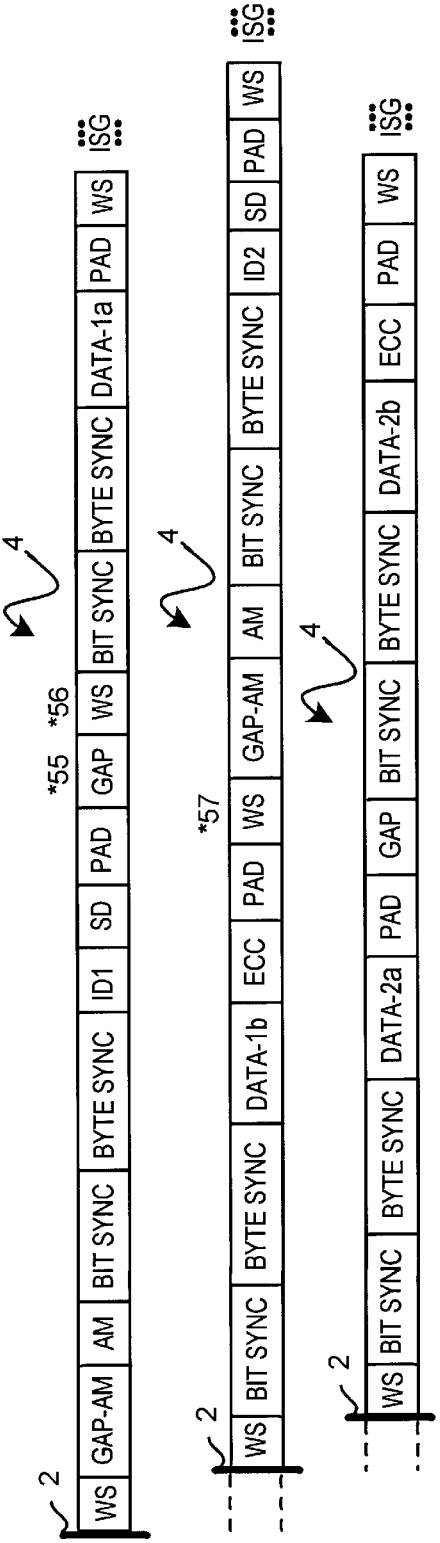
FIG. 7 is a diagram of a partial disk track formatted in accordance with the preferred embodiment of the present invention, after a Write operation.

FIG. 7 is a diagram of a partial disk track formatted in accordance with the preferred embodiment of the present invention, after a Write operation. The fields are essentially as shown in FIG. 5, with the exception of those fields marked with an asterisk. In this particular example, data is to be written to the DATA-1a and DATA-1b fields in the data segments 51a, 51b corresponding to a first data sector 16. The Write process for this example would entail the following steps:

1. Positioning the read/write transducer head over the track to be written;
2. Reading the track until an Address Mark (AM) field is detected in a first sector header 50;
3. Locking onto and synchronizing with the bit and byte patterns following the AM field using the BIT SYNC and BYTE SYNC fields;
4. Reading the ID field and comparing the LBA subfield with the desired LBA;
5. If necessary, repeating steps 2–4 until the desired LBA is located;
6. If the current LBA is the desired one, then reading the Segment Descriptor subfields from the SD field to determine the data segment structure of the current data sector 16 (i.e., how many data segments compose the data block 51, how many bytes are in each data segment, and what flags are set for each data segment).
7. Continuing processing to the end of the sector header 50, which is a preferably a fixed number of bytes after the sector header BYTE SYNC field (note that the data segments following the sector header 50 may or may not be in the current data wedge 4; for example, in FIG. 5, the sector header 50 for the DATA-2a and DATA-2b data segments is located in the prior data wedge);
8. After the end of the sector header 50 is reached, writing a GAP 55 to separate the first data segment 51a from the sector header 50, writing a new WS field 56, and writing a first data segment DATA-1a (comprising a BIT SYNC field, a BYTE SYNC field, a DATA field, a PAD field, and a WS field) (of course, only as many data bytes are written as will fit within the DATA-1a field, as determined from the corresponding Segment Descriptor subfield read in Step 6).
9. Writing the remaining bytes of the data sector 16 to the following data segment 51b in like manner.
10. The ECC field is written after the last data segment 16 indicated by the corresponding APPENDED ECC flag.
11. Allowing a WS field 57 after the second data segment 51b to separate it from the next data sector 16, since the second data segment 51b is the last data segment of the current data sector 16 and ends in the middle of a data wedge 4 (as would be indicated by the Wait/Not Wait and Last Data Segment flags of the corresponding Segment Descriptor).

The above process describes an inter-servo sample wedge Write process. For an intra-servo sample wedge Write process, those fields marked with an asterisk in FIG. 7 are not necessary, since existing fields from the formatting process perform those functions. Thus, in the example shown in FIG. 7, if data are to be written to the DATA-2a and DATA-2b fields in the data segments corresponding to a second data sector 16, no WS field is required before the GAP field that separates the DATA-2a and DATA-2b fields, since the GAP field is simply spanning a defect. Similarly, since at least one WS field separates the sector header for the DATA-2a and DATA-2b fields from those fields, no additional GAP or WS field is required.

Read Processing

The Read process for reading the DATA-1a and DATA-1b fields of the above example would be similar to the Write process, and would entail the following steps:

1. Positioning the read/write transducer head over the track to be read;
2. Reading until an Address Mark (AM) field is detected;
3. Locking onto and synchronizing with the bit patterns following the AM field using the BIT SYNC and BYTE SYNC fields;
4. Reading the ID field and comparing the LBA subfield with the desired LBA;
5. If necessary, repeating steps 2–4 until the desired LBA is located;
6. If the current LBA is the desired one, then reading the Segment Descriptors from the SD field to determine the data segment structure of the current data sector 16.

7. Continuing processing to the end of the sector header 50;

8. After the end of the sector header 50 is reached, skipping over the WS field, locking onto and synchronizing with the first data segment using the BIT SYNC and BYRE SYNC fields;

9. Reading the data from the DATA-1a field of the first data segment 51a;

10. If the current data segment is not the only one (as would be indicated by the Last Data Segment flag of the corresponding Segment Descriptor), then waiting for the end of the current data segment, which is preferably a calculable number of bytes after the previous BYTE SYNC field;

11. Re-syncing on the next data segment 51b;

12. Repeating steps 9–11 for the data in the DATA-1b field of the next data segment (which may be in the current data wedge or the next data wedge, as would be indicated by the Wait/Not Wait flag of the corresponding Segment Descriptor).

Alternative Embodiments

The invention has been described in the context of disk sectors 16 which comprise a header 50 and a data block 51. Further, the invention has been described in the context of what is known as a "soft sectored" disk format. That is, the starting location of a disk sector 16 on a track is determined by reading "soft" data from the track itself. However, the invention can be readily adapted to a "hard" sectored disk format and/or to "headerless" disk sectors 16. Accordingly, it should be understood that the phrase "data sector", as used in this description, encompasses both data sectors having headers 50 and data sectors lacking headers 50.

Further, the Segment Descriptor information for each data sector 16, or for an entire track, or for all of the tracks in a zone, or for an entire disk, need not be stored in conjunction with each data sector 16, as described more fully below.

In a "hard" sectored system, the starting location of a data sector 16 is determined relative to a servo sample wedge 2, or other delimiter, from absolute timing or position data stored or generated externally to a particular track. That is, a particular data sector 16 may be designated as being located a specified amount of time or number of bit cells after a servo sample wedge 2. Such timing information may be located on certain specified tracks of the disk media, or may be stored externally to the disk in an electronic device, such as a PROM or a flash memory device or similar device, or generated algorithmically.

If hard sectoring is used, a header 50 may or may not be used. In typical hard sectoring disk drives, an ID field in a header 50 is still used in order to verify that a desired data sector 16 has in fact been properly located. In such a case, the Segment Descriptor may be located within such a header 50, as described above with respect to the preferred embodiment.

In yet other embodiments, which may be used in combination with soft or hard sectored disk drives, and with or without headers 50, the Segment Descriptor information for each data sector 16 may be stored in a preceding servo sample wedge 2, or in a "lookup" table initially stored either on a special part of the disk media or in an electronic device, such as a PROM or flash memory or similar device.

In yet another embodiment, the Segment Descriptor information may be generated "on the fly" rather than predetermined and stored in a lookup table. Such algorithmic determination of Segment Descriptor information may most readily be used when the tracks of a disk surface are grouped into zones, such that all tracks within one zone have the same data segment mapping.

Accordingly, whatever means (hard sectoring or soft sectoring) are used to locate the starting location of a data sector 16, and whether or not a data sector 16 contains a header 50, and whether or not Segment Descriptor information is defined uniquely for and associated with each data sector 16 or can be applied to a set of similar data sectors 16 in a zone, the invention provides a means for splitting a data block 51 within a data sector 16 across servo sample wedges 2 and to locate data sectors 16 independently of the location of such servo sample wedges 2.

Application of the Invention

Figure 8:
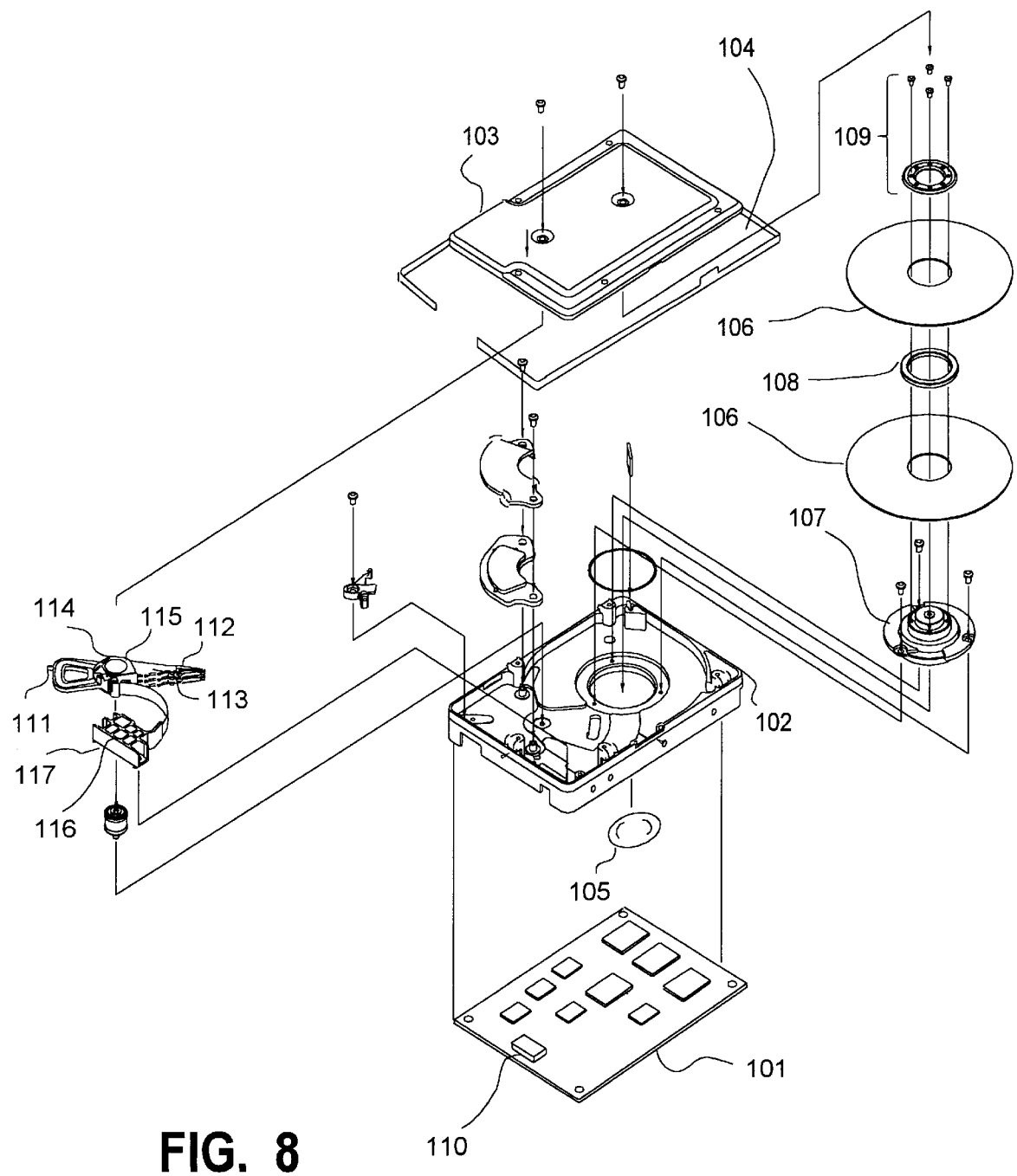
FIG. 8 is an exploded perspective view of a disk drive incorporating the present invention.

The present invention may be suitably adapted for use in conjunction with a disk drive of the type shown in exploded view in FIG. 8. A printed circuit board assembly ("PCBA") 101 includes numerous electronic components described in detail below with reference to FIG. 9. The PCBA 101 is attached to a base 102 by screws or similar means. A cover 103 attaches to the base 102 by screws or similar means. The base 102 and cover 103 and a conventional tape seal 104 are configure to form an essentially sealed enclosure. However, as known in the art, a "breather" membrane filter 105 may be provided for pressure equalization. One or more magnetic data storage disks 106 are provided, separated by a spacer 108, each having upper and lower recording surfaces. In the illustrated embodiment, the dimensions of the assembled enclosure and PCBA 101 are approximately 0.50 inches high by 2.75 inches long by 1.8 inches wide. The present invention may be embodied in disk drives having a different number of disks and other form factors.

A spindle motor 107 is mounted to the base 102. A disk clamp 108 assembly 109 is provided for mounting the disk 106 to the spindle motor 107. Preferably, the spindle motor 107 is a commercially available brushless three-phase motor. In operation, the spindle motor 107 rotates the disks 106 at a substantially constant angular velocity, typically in the range of 3000 to 6300 RPM.

An electrical connector 110 is provided on the PCBA 101. Some of the electronic components on the PCBA 101 are electrically connected by the connector 110 to electronic components within the sealed enclosure formed by the base 102 and the cover 103.

A voice-coil assembly 111 is provided, and typically includes two read/write transducer heads 112 per disk 106. In operation, each head 112 provides for writing data to, and reading data from, a disk 106. The voice-coil assembly 111 includes an actuator assembly that supports the heads 112 as they fly in conventional manner proximate to the disks 106, and moves the heads 112 into desired position for writing and reading operations on the disk 106. The actuator assembly includes load beams 113 and an "E-block" 114. At one end, each load beam 113 supports a head 112, and at the opposite end, each load beam 113 is supported by the E-block 114. A pivot bearing 115 defines an axis of rotation for the voice-coil assembly 111.

The voice-coil assembly 111 further includes a flex circuit assembly 116. The flex circuit assembly 116 includes an integrated multiplexer circuit (not shown) for controlling the writing of data to, and the reading of data from, the surfaces of the disks 106. The multiplexer circuit is suitably implemented by a commercially available integrated circuit manufactured and sold by Silicon Systems Inc. of Tustin, Calif. as part no. SSI 2020. The multiplexer circuit provides a write current to the particular head 112 selected for writing, and also contains a read preamplifier for the particular head 112 selected for reading. A mode select signal from the PCBA 101 determines whether the multiplexer circuit is to operate in a read or write mode.

The flex circuit assembly 116 also includes a flex cable 117 comprising conductive leads encased in a flexible plastic carrier. The flex cable 117 forms part of the electrical conduction path between the heads 112 and certain read/write control electronic circuits on the PCBA 101.

A magnet assembly actuator 118 and a latch assembly 119 are provided to cooperate with the voice-coil assembly 111 to form a voice-coil motor.

The masses of the voice-coil assembly 111, including the heads 112 and the E-block 114, are preferably disposed about the axis of rotation of the pivot bearing 115 such that the center of rotation of the pivot bearing 115 is also the center of mass of the voice-coil assembly 111. The voice-coil assembly 111 is freely rotatable through an arcuate range corresponding to an arcuate movement of the transducer heads 112 across the usable surface of the magnetic data storage disks 106. Rotation of the voice-coil assembly 111 is implemented by applying appropriate electrical currents to the voice-coil assembly 111, in known fashion.

Electrical connection of the flex circuit assembly 116 to the PCBA 101 is made through a gasketed opening provided in the base 102 to the electrical connector 110 on the PCBA 101. Electrical contact is made when the connector 110 is inserted through the gasket opening as the PCBA 101 is mated to the housing during an assembly process.

Figure 9:
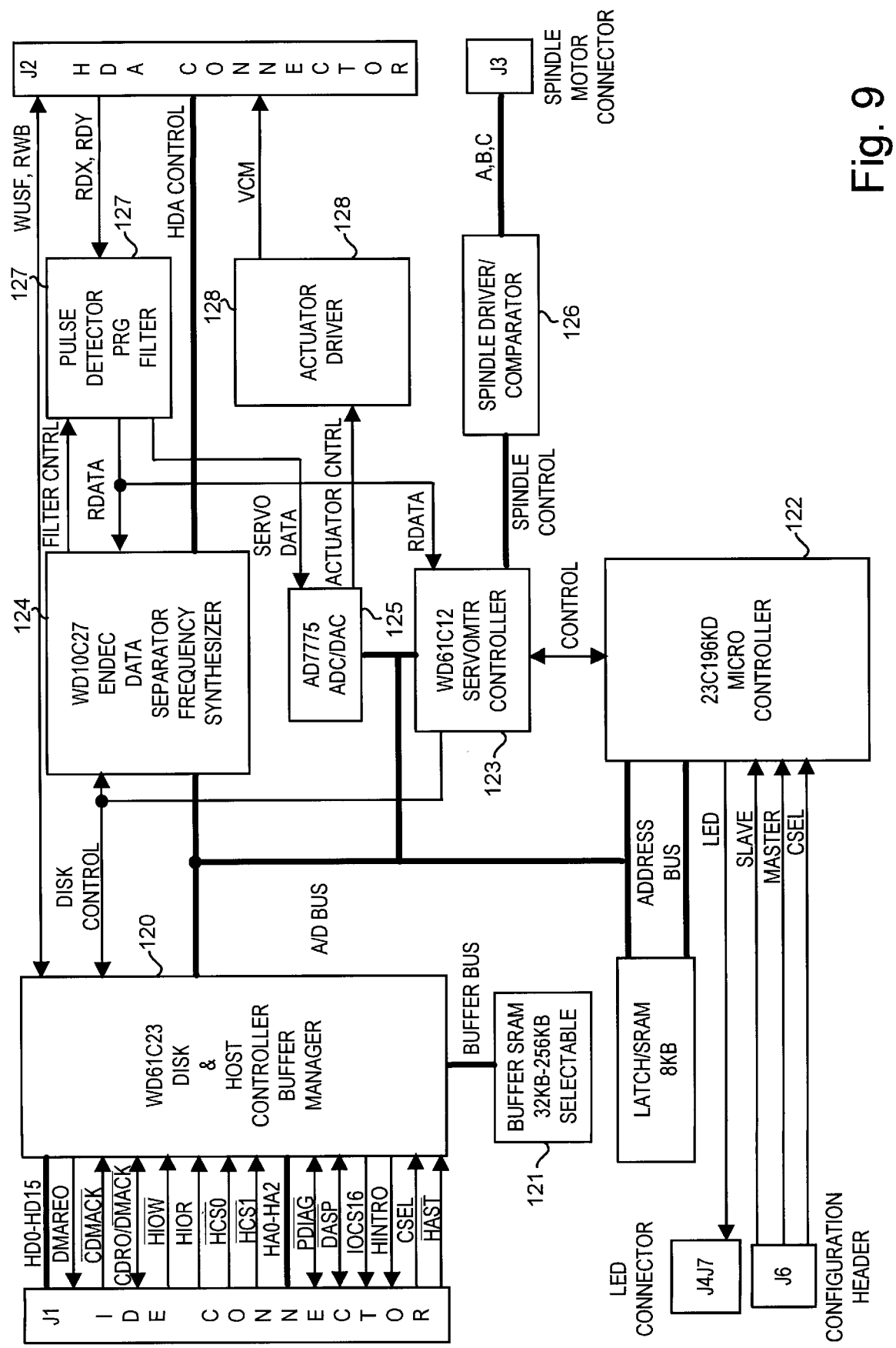
FIG. 9 is a block diagram of a storage unit control circuit for implementing the servo-independent format of the present invention and controlling a disk drive of the type shown in FIG. 8.

FIG. 9 is a block diagram of a storage unit control circuit (conventionally referred to as the drive electronics) for implementing the servo-independent format of the present invention and controlling a disk drive of the type shown in FIG. 8. The major electronic circuit components are preferably implemented as integrated circuits.

The drive electronics are disposed on a printed circuit board which is fixed to the disk drive housing, such as the PCBA 101 in FIG. 9. A connector J2 corresponds to the electrical connector 9 in FIG. 9. Electrical connection of the drive electronics to a host computer's host system bus (such as the AT bus commonly used in IBM-type personal computers) is made through a host system bus interface connector J1, in known fashion.

The drive electronics include a host interface disk controller (HIDC) 120 which directly connects to the host system bus via the interface connector J1. The HIOC 120 integrates conventional formatter/controller, CRC/ERC generator/checker, host interface, and buffer manager functions into a single integrated circuit containing two microcontrollers with associated ROM storage. The HIDC 120 may be a commercially available device such as the WD61C23 HIDC from Western Digital Corp. of Irvine, Calif. A 32-KByte sector buffer 121 is connected to the HIDC 120 and enhances data throughput of the disk drive by buffering sector data between the disk drive and the host system bus.

A 16-bit microcontroller 122 controls and coordinates the activity of the voice-coil assembly 111 and the HIDC 120. The microcontroller 122 is suitably programmed to implement the Write and Read processes described above. The microcontroller 122 receives and sends command or status information over an internal multiplexed address/data (A/D) bus. Also connected to the AND bus are a servo/motor controller 123, an ENDEC/data separator/frequency synthesizer 124, and an ADC/DAC circuit 125.

The servo controller 123 and ENDEC 124 are also connected to the HIDC 120 via a disk control bus. The servo controller 123 may be a commercially available device such as the WD61C12 Servo/Motor Controller from Western Digital Corp. of Irvine, Calif. Similarly, the ENDEC 124 may be a WD19C27 Separator/Frequency Synthesizer device from Western Digital Corp. of Irvine, Calif.

The servo controller 123 provides servo discrimination, track address capture, and spindle motor control. For spindle motor control, the servo controller 123 preferably operates in accordance with the teachings of co-pending U.S. patent application Ser. No. 07/951,378, now U.S. Pat No. 5,223,771 entitled "Polyphase Brushless DC Motor Control," assigned to the assignee of the present invention. Such teachings are hereby incorporated by reference. The servo controller 123 is coupled through a spindle driver/comparator 126 to the disk drive through a spindle motor connector J3. The spindle driver/comparator 126 may be, for example, a Model 6232 from SGS Thompson.

The ENDEC 124 handles read/write signals between the HIDC 120 and the read channel circuitry, receiving read data from the read/write heads 112 via the multiplexer circuit described above with respect to FIG. 8 and a pulse detector/frequency filter 127, and providing write data to the heads 112 via the multiplexer circuit. More particularly, the ENDEC 124 performs the following functions: data synchronization, frequency synthesis, read channel filter control, encoding and decoding (ENDEC), and write pre-compensation. The pulse detector/frequency filter 127 converts analog read data received from the multiplexer circuit to a digital data stream (RDATA) which is provided to the ENDEC 124, in which data is separated from synchronization and location information in a conventional manner. The data is transferred to the HIDC 120, which temporarily stores the data in the sector buffer 121 until the host system is ready to receive it over the interface connector J1.

The ENDEC 124 may include circuitry operating in accordance with the teachings of co-pending U.S. patent application Ser. No. 07/695,531, now U.S. Pat. No. 5,212,601 entitled "Disk Drive Data Synchronizer with Window Shift Synthesis", filed May 3, 1991, and/or with the teachings of co-pending U.S. patent application Ser. No. 07/685,473, now U.S. Pat. No. 5,278,702 entitled "Data Synchronizer with Symmetric Window Generation", filed Apr. 4, 1991, both assigned to the assignee of the present invention. Such teachings are hereby incorporated by reference.

When a selected read/write head 112 passes over a servo sample wedge 2, the RDATA is processed by the servo controller 123. The servo controller 123 provides data synchronization, servo address mark detection, and servo track address decoding, in substantially the same way as the ENDEC 124. The servo address mark is used to generate positional timing reference signals for the drive electronics. Such positional timing reference signals enable the ADC/DAC 125 to demodulate analog servo bursts from the servo sample wedges 2 in order to determine head position relative to the centerline of a selected track. The demodulated data is provided to the servo controller 123 and the microcontroller 122 via the internal A/D bus. Firmware within the microcontroller 122 determines the degree of head misalignment (if any) and commands the servo controller to move the head back in alignment with the track centerline. Head movement commands are directed to a DAC (digital-to-analog converter) contained within ADC/DAC 125, which converts digital command signals from the microprocessor 122 and servo controller 123 into analog signals. Analog head movement signals (VCMDAC) and a voltage reference signal (VREF) are sent to an actuator driver integrated circuit 128. The actuator driver 128 moves the voice-coil assembly 111 by providing VCM drive signals (VCMIN and VCMOUT). The actuator driver 128 may be a commercially available device such as the Model 3173 from Unitrode Corporation.

Dynamically Reconfigured Read Channel

The present invention makes the location of data independent of the location of servo sample information. Accordingly, by taking advantage of this fact, higher areal density can be achieved using the present invention by modifying the read channel characteristics of the drive electronics to independently optimize the read channel for processing servo information and data. Hence, the servo sample wedges 2 can provide servo information at a servo channel rate, and the data wedges 4 can store data sectors at a data channel rate, where the data channel rate and servo channel rate are independent.

Figure 10:
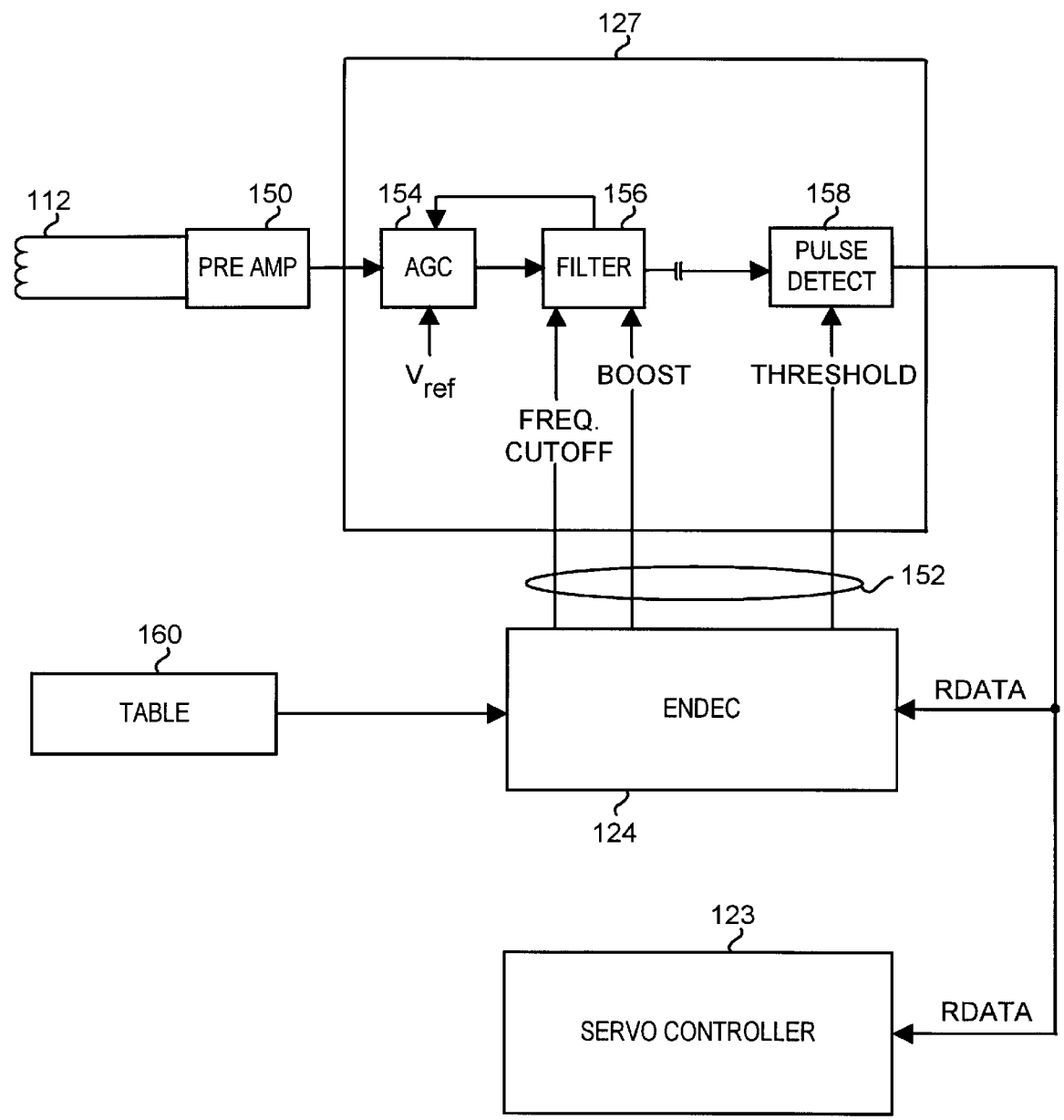
FIG. 10 is a block diagram of a preferred read channel circuit for use in conjunction with the present invention.

FIG. 10 is a block diagram of a preferred read channel circuit for use in conjunction with the present invention. Most of the components correspond to components shown in FIG. 9. Thus, a transducer head 112 is coupled to a preamplifier 150, which preferably comprises a wide-band high gain amplifier. The output of the preamplifier 150 is coupled to a pulse detector/frequency filter (PDFF) integrated circuit 127, which may be, for example, the model 3040 from Silicon Systems Inc. of Tustin, Calif. Filter control lines 152 couple the ENDEC circuit 124 to the PDFF 127. In the preferred embodiment, the output of the PDFF 127 comprises read data (RDATA) which contains time-multiplexed data from data wedges 4 and servo sample wedges 2. The RDATA signal is coupled to an input of the ENDEC 124 and to an input of the servo controller circuit 123.

In an alternative embodiment, RDATA from the data wedges 4 and servo sample wedges 2 may be separated and output on individual signal lines, instead of time-multiplexed over a single signal line.

Within the preferred PDFF 127, an automatic gain control (AGC) circuit 154 receives input from the preamplifier 150. The output of the AGC circuit 154 is coupled to a programmable frequency filter 156, which filters the incoming frequency and provides a feedback signal to the AGC circuit 154. The output of the frequency filter 156 is typically capacitively coupled to a pulse detector circuit 158, which shapes signals over a definable threshold into square wave pulses.

The PDFF 127 provides user-setable frequency cut off and boost signals to the programmable frequency filter 156, and a user-setable threshold value for the pulse detector 158. The present invention makes use of these signal inputs by tuning the read channel defined by the preamplifier 150, AGC circuit 154, programmable frequency filter 156, and pulse detector circuit 158 to the differing characteristics of the signals derived from the transducer head 112 passing over servo sample wedges 2 and data wedges 4. That is, the present invention dynamically reconfigures the read channel equalization characteristics depending upon whether servo information or data information is being processed. This permits the characteristics of the servo sample wedges 2 and data wedges 4 to be independently optimized, which generally results in tighter tolerances with respect to bit cell timing, and therefore higher bit densities on a disk surface.

These benefits are accomplished by dynamically changing the frequency cutoff, boost, and threshold signals to the PDFF 127 between the desired characteristics for servo information and for data information as the disk rotates beneath the transducer head. To accomplish this, the ENDEC 124 is preferably coupled, directly or indirectly, to a table 160 of servo and data wedge read channel values. The table 160 may be stored in a memory device, such as a PROM or flash memory circuit or similar device, or may be stored on a selected portion of the disk media itself and read into a RAM device for operational use. (If the table information is stored on the medium itself, it may be necessary to provide a set of default values that are used to dynamically reconfigure the read channel during a start-up mode, so that the table information can be read from selected tracks of the disk.)

In operation, internal registers within the ENDEC 124 are loaded with the frequency cutoff, boost, and threshold values for both servo sample wedges 2 and data wedges 4 for each track during a seek operation, under the control of the microcontroller 122.

During both seek and track following operations, just before a selected transducer head 112 passes over a servo sample wedge 2, the appropriate registers containing the frequency cutoff, boost, and threshold values for servo sample wedges 2 are selected. Those values are coupled to internal digital-to-analog converters (DACs) and converted by the DACs to corresponding analog signals. The analog signals are applied to the appropriate inputs of the PDFF 127, thereby adjusting the characteristics of the PDFF 127 to optimum values for reading information from servo sample wedges 2. In an alternative embodiment, the registers corresponding to servo sample wedges 2 may be selected at all times during a seek operation.

Similarly, at least during track following operations, just before a selected transducer head 112 begins to pass over a data wedge 4, the appropriate registers containing the frequency cutoff, boost, and threshold values for data wedges 4 are selected, and those values are converted to corresponding analog signals. The analog signals are input to the PDFF 127, thereby reconfiguring the read channel characteristics to values that are optimum for processing signals from a data wedge 4.

Selection of the appropriate registers is preferably controlled by the servo controller 123. However, the process may be accomplished by a dedicated state machine, by circuitry built into the ENDEC 124, by the microcontroller 122, by the HIDC 120, or by similar circuitry.

In the preferred embodiment, the table 160 contains predetermined frequency cutoff, boost, and threshold data values for the servo sample wedges 2 and data wedges 4 of each track of a disk drive. This information is preferably determined during a calibration procedure for each disk drive during manufacture, in order to take into account the particular characteristics of the read channel electronics and the disk media on an individual drive basis. Further, the table 160 may contain different values for different tracks. Thus, for example, each track of a disk drive may have its read channel characteristics independently optimized for both servo and data information. In practice, it may be desirable to set the same table values for a plurality of tracks defining a zone, thereby reducing the size of the table 160. Thus, the preferred embodiment of the read channel used in conjunction with the present invention is dynamically reconfigured between servo and data wedges during disk rotation, and may be further adjusted from head-to-head or track-to-track or zone-to-zone.

While the above discussion has focused on dynamically reconfiguring the signal processing portion of the read channel for frequency cutoff, boost, and threshold values, the same principle can be applied for dynamically reconfiguring the data synchronization portion of the read channel for window centering. In addition, the same principle can be applied for dynamically reconfiguring the write channel when writing to a track within a data wedge 4. Thus, the table 160 may contain additional values relating to read operations, such as window centering information, and/or relating to write operations, such as write precompensation information and write current information. In a manner similar to that described above for read channel reconfiguration, each time the transducer head 112 is about to begin passing over a data wedge 4, the write channel can be reconfigured by reading appropriate table entries for the corresponding track from the table 160 and reconfiguring the write channel characteristics.

In an alternative embodiment, the channel characteristics may be algorithmically determined "on the fly" rather than read from a "lookup" table. Moreover, although FIG. 10 shows a single time-multiplexed read channel, this aspect of the invention can be applied to numerous variations of dedicated and multiplexed components. For example, the read channel may comprise a single preamplifier 150 and AGC circuit 154 coupled to dual filters 156 with fixed frequency cutoff and boost values, but which are both coupled to a single pulse detector circuit 158 having a setable threshold. Furthermore, this aspect of the invention could be used in a conventional disk drive that does not split data sectors 16 across servo sample wedges 2.

Preferred Address Mark Format

In a disk drive system of the type shown in FIGS. 8 and 9, the disk 104 can be physically formatted using the drive electronics according to the process set forth above for determining the Segment Descriptor field values for "empty" data sectors 16 on each track. All of the fields described in conjunction with FIG. 5 may be written using known techniques.

While the invention as described above may be used with conventional address marks, because data sectors can start essentially anywhere within a data wedge of a track, it is beneficial to have a more "robust" address mark in order to minimize errors in rapidly identifying the start location of data sectors 16. Accordingly, the preferred embodiment of the invention uses an improved format for the address mark for each data sector 16. The preferred address mark format reduces false address mark detection.

Figure 11:
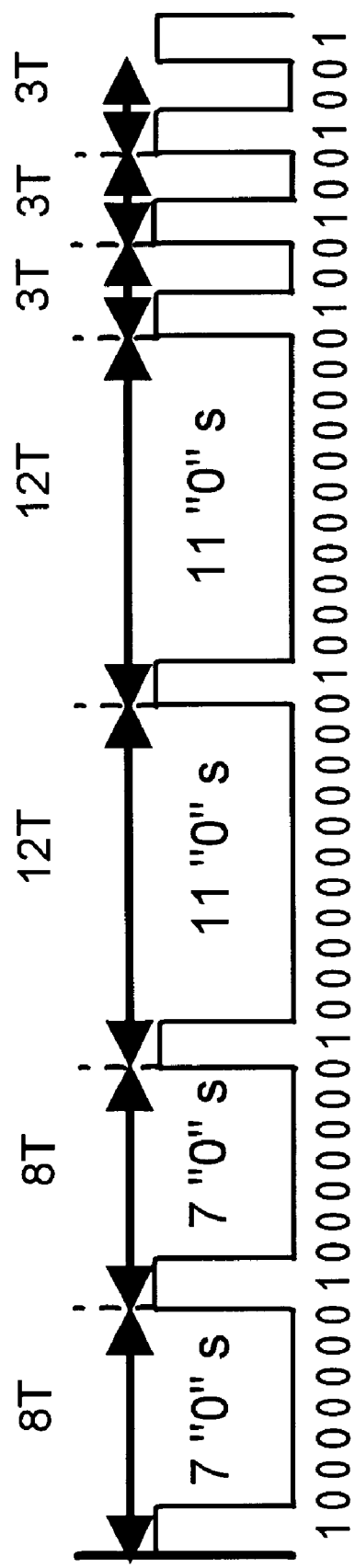
FIG. 11 is a diagram showing a preferred format of an address mark for use in conjunction with the present invention.

In accordance with the preferred embodiment of the invention, address mark detection is assume to be successful only when specific pattern sequences have been detected in the synchronized raw read data. These patterns must be found in sequence, and only following assertion of an address mark enable (AME) signal in conventional fashion. The preferred address mark nominally comprises the pattern "8T8T12T12T3T3T3T" (where "nT" means "n" bit-cell times), as shown in FIG. 11. The following rules describe the detection process for the address mark shown in FIG. 11:

1. Detection of a "1" followed by at least six consecutive "0"s;
2. Detection of a "1" followed by at least nine consecutive "0"s no more than 3 nonreturn to zero (NRZ) byte times following detection of the first sequence above;
3. Detection of a "1" followed by at least three consecutive high frequency (HF) intervals (i.e., "1001001001") no more than 3 NRZ byte times following detection of the second sequence above).

If all three sequences are detected, an Address Mark Detect (AMD) signal is asserted.

It has been found that the address mark sequence shown in FIG. 11 has several unique qualities which are important in ensuring high probability of correct detection. The leading "1" in the address mark is always formatted preceding the first 8T interval in order to guarantee the interval width. When the AME signal is asserted during disk Write operations, the address mark is "jammed" into the serial encoded bit stream to be written. This is necessary to ensure that the address mark placement is exact and does not depend upon synchronization to a previous interval. Jamming of the address mark therefore creates an arbitrary run length between the prior GAP-AM field and the address mark. This may result in the violation of the RLL code, such that a 1T interval is created. If a 1T interval is created at the leading edge of an address mark, the second of the two "1"s is suppressed, and the address mark sent to the write electronics is adjusted to be "9T8T12T12T3T3T3T".

High frequency intervals will be formatted as 3T intervals during address mark generation. The threshold of the HF detection circuitry should allow any interval in the range of 2T to 4T to account for asynchronisms. The frequency detection portion of the address mark recognition process provides additional protection against false detection of an address mark as the transducer head passes over write splice (WS) fields and unformatted surface. Accordingly, it is preferred that the GAP-AM field prior to the address mark be written with a constant 5T pattern which will guarantee that any false detection of six and/or nine "0" intervals will not result in an address mark detection, since such a 5T pattern in the GAP-AM field falls outside the threshold of the high frequency detection circuit. (False detections of this kind are not unlikely, as a 6T interval in a data field CRC, followed by 9T interval in a subsequent WS field, is entirely possible.)

To prevent lockup of the detection circuitry, it is desirable to provide time-outs for nine "0" detection and for HF pattern detection. With the pattern shown in FIG. 11, in the worse case, nine "0"s should be detected no more than 34T after a six "0"s are detected. Similarly, the high frequency pattern must be detected no later than 24T following detection of nine "0"s.

In order to accommodate the possibility that the WS field preceding the GAP-AM field before an address mark trips either the six "0" detector or six "0"/nine "0" detector, the length of the GAP-AM field needs to be long enough that the respective timeouts do not occur within the following real address mark field. This is accomplished by formatting a GAP-AM field with a length of no less than 3 NRZ bytes.

In summary, formatting the GAP-AM field with a minimum of 3 NRZ bytes of 5T before each address mark will greatly reduce the susceptibility to false address mark detection. In the preferred embodiment, this can be done with a repeating 735CD (hexadecimal) NRZ gap pattern assuming even framing, or a repeating 357D7 (hexadecimal) NRZ gap pattern for odd framing, using conventional 1,7 RLL coding rules. Other patterns could be used with other coding rules.

Advantages of the Invention

Using the present invention, a 3½" form factor magnetic disk drive can be implemented with 56 servo sample wedges, 56 sectors per track at the smallest radius, and 96 sectors per track at the largest radius. In comparison, a similarly sized disk drive using embedded ZBR would typically have from 56 to 96 servo sample wedges, with inter-zone guard bands, storage area taken up on the extra outer radius servo sample wedges, and other complications. Overall, the present invention provides more capacity than a similar embedded ZBR formatted system. Thus, the present invention provides an improvement over zone bit recording, with greater storage capacity. In particular, the invention has the following advantages:

No space-wasting inter-zone guard bands are required, as in embedded ZBR, since a fixed number of servo sample wedges are preferably used for the entire disk surface.

No surplus servo sample wedges.

Because the data channel rate and servo channel rate are completely independent, the system can be independently optimized for flux changes per inch and tracks per inch.

Servo sample wedges can be phase coherent, thereby minimizing servo system complexity.

The bandwidth of the system microprocessor can be optimized to match the servo feedback loop requirements.

The size of each data block can be varied between tracks.

The size of each data segment can vary between data wedges and tracks.

The invention permits "defect swallowing", by allowing a data block to be split around small defects within a data wedge of a track.

The invention provides for "wedge push down" defect management, in which a data segment can be started at a next servo sample wedge of a track if a large defect occurs in the previous data wedge of the track.

A number of embodiments of the present invention have been described. Nevertheless, it will be understood that various modifications may be made without departing from the spirit and scope of the invention. For example, the invention may be used with both magnetic and optical disk storage units. Further, while the invention is best used with a constant number of servo sample wedges for all tracks of a disk surface, the invention could also be used in other combinations. Accordingly, it is to be understood that the invention is not to be limited by the specific illustrated embodiment, but only by the scope of the appended claims.

We claim:

1. A disk drive comprising:

a disk;

means for rotating the disk at a substantially constant angular velocity;

the disk having a magnetic surface having data signals and servo signals stored thereon;

the stored data signals occupying a plurality of data areas and the stored servo signals occupying a plurality of servo areas that are interleaved between the data areas;

the stored data signals being arranged in a plurality of tracks;

a transducer head for generating a time-multiplexed read signal that, during first time slots of a disk revolution, has a first frequency and corresponds to a set of the stored data signals, and during second, alternating, time slots of the disk revolution, has a second frequency and corresponds to, a set of the stored servo signals, the second frequency being different from the first frequency;

filter means, having a first input for receiving the read signal, an output for providing a filtered signal, and a second input for receiving an equalization control signal, for controlling the equalization of the filtered signal based on the equalization control signal; and control means, connected to the filter means, for repeatedly adjusting the equalization control signal during a disk revolution so as to provide separate control of the equalization of the filtered signal during the different times that the read signal corresponds to stored data signals and stored servo signals.

2. A disk drive as set out in claim 1, wherein said tracks are arranged in concentric groups corresponding to zones and wherein the data signals cause the read signal to have, during the first time slots, a variable frequency in that the frequency thereof depends upon which zone is passing beneath the head, and the servo signals cause the read signal to have a substantially constant frequency during the first time slots.

3. A disk drive as set out in claim 1, wherein said equalization control signal adjusts the frequency cutoff value of said filter means.

4. A disk drive as set out in claim 1, wherein said equalization control signal adjusts the boost provided by the filter means.

5. A disk drive as set out in claim 1, further comprising a peak detector circuit coupled to receive the filtered signal from said filter means and wherein said control means adjusts the threshold of said peak detector circuit.

6. A method for reading and processing servo data and interspersed user data stored on a data storage disk, comprising the steps of:

generating a time-multiplexed read signal that, during first time slots of a disk revolution, has a first frequency and corresponds to a set of the stored data signals, and during second, alternating, time slots of the disk revolution, has a second frequency and corresponds to a set of the stored servo signals, the second frequency being different from the first frequency;

filtering the read signal and providing a filtered signal, said filtering including controlling the equalization of the filtered signal based on an equalization control signal; and repeatedly adjusting the equalization control signal during a disk revolution so as to provide separate control of the equalization of the filtered signal during the different times that the read signal corresponds to stored data signals and stored servo signals.

* * * * *